United States Patent
Hiraishi et al.

(10) Patent No.: US 7,815,245 B2
(45) Date of Patent: Oct. 19, 2010

(54) FRONT PART STRUCTURE OF VEHICLE BODY

(75) Inventors: Yuuki Hiraishi, Shizuoka (JP); Kengo Miyawaki, Shizuoka (JP); Junji Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 163 days.

(21) Appl. No.: 12/190,650

(22) Filed: Aug. 13, 2008

(65) Prior Publication Data

US 2009/0058134 A1 Mar. 5, 2009

(30) Foreign Application Priority Data

Aug. 29, 2007 (JP) ............................. 2007-221946

(51) Int. Cl.
*B62D 25/08* (2006.01)
(52) U.S. Cl. ............................. 296/187.09; 296/203.02; 293/155
(58) Field of Classification Search ............ 296/187.03, 296/187.1, 187.04, 203.01, 203.02, 193.09, 296/187.09; 293/133, 155
See application file for complete search history.

(56) References Cited

U.S. PATENT DOCUMENTS

| | | | | |
|---|---|---|---|---|
| 5,314,229 A | * | 5/1994 | Matuzawa et al. | 296/187.09 |
| 6,672,652 B2 | * | 1/2004 | Takeuchi et al. | 296/193.09 |
| 6,736,449 B2 | | 5/2004 | Takahashi et al. | |
| 7,258,392 B2 | * | 8/2007 | Frederick et al. | 296/187.09 |
| 2008/0231080 A1 | | 9/2008 | Sangu | |

FOREIGN PATENT DOCUMENTS

| | | |
|---|---|---|
| DE | 10 2004 031 086 A1 | 1/2006 |
| DE | 602 07 015 T2 | 8/2006 |
| EP | 1 321 351 A2 | 6/2003 |
| JP | 2003-165462 | 6/2003 |

OTHER PUBLICATIONS

Translation of DE 102004031086, European Patent Office, pp. 1-14.*
Office Action issued in German Patent Application No. 102008039138.7 on Jul. 8, 2009.
English language Abstract of JP 2003-165462, Jun. 10, 2003.
U.S. Appl. No. 12/191,470 to Murata et al, which was filed on Aug. 14, 2008.

* cited by examiner

*Primary Examiner*—Dennis H Pedder
(74) *Attorney, Agent, or Firm*—Stein McEwan, LLP

(57) ABSTRACT

A front part structure of a vehicle body is provided. A suspension frame disposed posterior to a front-side component in a longitudinal direction of the vehicle. An apron side member extends in the longitudinal direction. An apron lower member extends in the longitudinal direction, connects the front-side component and the suspension frame and is disposed below the apron side member. A first shock absorbing portion is provided in a front end portion of the apron side member. A second shock absorbing portion is provided in a front end portion of the apron lower member such that the second shock absorbing portion is disposed below the first shock absorbing portion.

6 Claims, 10 Drawing Sheets

FRONT PART STRUCTURE OF VEHICLE BODY

This application claims priority from Japanese Patent Application No. 2007-221946 filed Aug. 29, 2007, the entire contents of which are herein incorporated by reference.

BACKGROUND

The present invention relates to a front part structure of a vehicle body including an apron side member which is disposed in a longitudinal direction of a vehicle, an apron lower member which is disposed below the apron side member in the longitudinal direction of the vehicle so that the apron lower member connects a front-side component of a vehicle to a suspension frame, and a first shock absorbing portion which is provided in a front end portion of the apron side member.

In general, an apron side member and an apron lower member are configured to have large rigidity to support a large shock applied from a front side of a vehicle together with the rear-side components. Accordingly, the large shock is easily transmitted to the rear-side components of the vehicle. However, in such a structure, a shock is easily transmitted to the rear-side components even when a small load is applied in a slight collision. As a result, since the rear-side components are easily deformed upon being applied with the small load, the rear-side components have to be exchanged even when a slight collision occurs. Therefore, a problem arises in that it is difficult to exchange such rear-side components in many cases and a repair cost is expensive.

For this reason, in the past, Patent Document 1 discloses a front part structure in which a first shock absorbing portion is provided in the front end portion of the apron side member and the front end portion of the apron lower member is disposed at a position closer to the rear side of the vehicle than the first shock absorbing portion, thereby enabling the first shock absorbing portion to absorb a shock generated from a slight collision. Accordingly, only the first shock absorbing portion can be exchanged later on in an easy manner.

Patent Document 1: Japanese Patent Publication No. 2003-165462 A

According to the known front part structure, although a repair cost can be reduced, since only the first shock absorbing portion which is provided on the front end portion of the apron side member absorbs a shock applied from the front side of the vehicle in a slight collision, the length of the first shock absorbing portion as means for sufficiently absorbing a shock needs to be long to the front side of the vehicle. Therefore, a problem arises in that flexibility in exterior design of the front part structure of the vehicle body decreases.

SUMMARY

It is therefore an object of the invention to provide a front part structure of a vehicle body capable of reducing a repair cost by sufficiently absorbing a shock generated from the front side of the vehicle in a slight collision and of remarkably improving flexibility in exterior design of the front part structure of the vehicle body.

According to an aspect of an exemplary embodiment of the present invention, there is provided front part structure of a vehicle body, comprising: a front-side component of a vehicle; a suspension frame disposed posterior to the front-side component in a longitudinal direction of the vehicle; an apron side member extending in the longitudinal direction; an apron lower member extending in the longitudinal direction, connecting the front-side component and the suspension frame and being disposed below the apron side member; a first shock absorbing portion which is provided in a front end portion of the apron side member; and a second shock absorbing portion which is provided in a front end portion of the apron lower member such that the second shock absorbing portion is disposed below the first shock absorbing portion.

With such a configuration, since the first shock absorbing portion and the second shock absorbing portion absorb a shock generated from the front side of the vehicle, it is possible to improve shock absorbing performance. Also, since each length of the first shock absorbing portion and the second shock absorbing portion in the longitudinal direction of the vehicle can be made short, it is possible to remarkably improve flexibility in exterior design of the front part structure of the vehicle body.

Additionally, since the shock absorbing portion is provided in the front end portion of the apron lower member, it is possible to ensure rigidity of the apron lower member portion on the rear side of the vehicle (rear portion of the apron lower member) more than the second shock absorbing portion. Accordingly, when a large load is applied, the apron lower member can transmit a shock to the rear side of the vehicle together with the apron side member, thereby restricting the vehicle body from being deformed.

That is, the apron lower member can be configured to be securely used when a small load is applied from a slight collision or when a large load is applied.

The first shock absorbing portion may be attached to the front end portion of the apron side member through an attachment flange; the apron lower member may include the front end portion disposed anterior to the attachment flange in the longitudinal direction and rear portion disposed posterior to the front end portion; and a rigidity of the front end portion of the apron lower member may be lower than a rigidity of the rear portion of the apron lower member so that the front end portion serves as the second shock absorbing portion.

Since the first shock absorbing portion is attached to the front end portion of the apron side member through the attachment flange, the first shock absorbing portion can be configured as a member separated from the apron side member, thereby improving the production of the first shock absorbing portion. Also, it is possible to efficiently absorb a shock generated from the front side of the vehicle and it is possible to easily carry out an attachment operation or an exchange operation of the first shock absorbing portion.

In addition, since the second shock absorbing portion is configured such that the front end portion of the apron lower member protrudes to the front side of the vehicle more than the attachment flange and the protruding front end portion of the apron lower member is made weaker than the apron lower member portion of the front end portion on the rear side of the vehicle, it is possible to easily manufacture the second shock absorbing portion.

The front end portion of the apron lower member may be comprised of a first plate member and the rear portion may be comprised of a second plate member; and a thickness of the first plate member may be thinner than the second plate member. Accordingly, it is possible to easily manufacture the second shock absorbing portion.

The first shock absorbing portion may be connected to the second shock absorbing portion through a lamp support brace extending in a vertical direction.

Since a shock is dispersed to the first shock absorbing portion, the second shock absorbing portion, and the lamp support brace between both shock absorbing portions, a shock can be absorbed through those three points, thereby improving shock absorbing performance. In addition, since the front end portion of the apron lower member can be fixed, it is possible to obtain a large attachment span of the apron lower member. Then, since the apron lower member can be connected to the components which are disposed at a position closer to the front side of the vehicle, it is possible to improve rigidity of the vehicle body.

The first shock absorbing portion may be comprised of a plate member so as to have a square box shape in a sectional view; a side face of the first shock absorbing portion may be welded and fixed to a side face of the lamp support brace in a width direction of the vehicle; the attachment flange may include a first flange portion welded and fixed to a rear end surface of the first shock absorbing portion and a second flange portion welded and fixed to the front end portion of the apron side member; and the first flange portion may be fastened to the second flange portion by a bolt.

Since the first shock absorbing portion is made of a plate member so as to have a square box shape in a sectional view, it is possible to manufacture the first shock absorbing portion with a simple structure so as to easily absorb a shock generated from the front side of the vehicle. Additionally, the side surface of the first shock absorbing portion is fixed by welding to the side surface of the lamp support brace on the outside of the width direction of the vehicle while overlapping with the side surface. Then, the attachment flange includes the first flange portion which is fixed by welding to the rear end surface of the first shock absorbing portion and the second flange portion which is fixed by welding to the front end portion of the apron side member. Subsequently, the first flange portion is fixed by a bolt to the second flange portion while overlapping with the second flange in the longitudinal direction of the vehicle. In this way, it is possible to simply configure the connection structure of the first shock absorbing portion, the lamp support brace, and the apron side member.

The front-side component may include a radiator support lower member extending in a width direction of the vehicle; a lower end portion of the lamp support brace may be connected to one end portion of the radiator support lower member; and the second shock absorbing portion may be fixed by a bolt to a connection portion between the lower end portion of the lamp support brace and the one end portion of the radiator support lower member.

Since the lower end portion of the lamp support brace is connected to the one end portion of the radiator support lower member and the second shock absorbing portion is fixed by a bolt to the connection portion between the lower end portion of the lamp support brace and the one end portion of the radiator support lower member, it is possible to easily transmit a shock generated from the front side of the vehicle to the second shock absorbing portion, thereby enabling the second shock absorbing portion to easily absorb a shock.

The front end portion of the apron lower member may be comprised of a plate member; and a convex portion may be formed on the plate member. Accordingly, it is possible to easily manufacture the second shock absorbing portion.

According to the invention, it is possible to provide the vehicle front part structure capable of reducing a repair cost by sufficiently absorbing a shock from the front side of the vehicle in a slight collision and of remarkably improving flexibility in exterior design of the front part structure of the vehicle body.

BRIEF DESCRIPTION OF THE DRAWINGS

The above and other aspects of the present invention will become more apparent by describing in detail exemplary embodiments thereof with reference to the accompanying drawings, wherein.

DETAILED DESCRIPTION OF EXEMPLARY EMBODIMENTS

Figure 1:
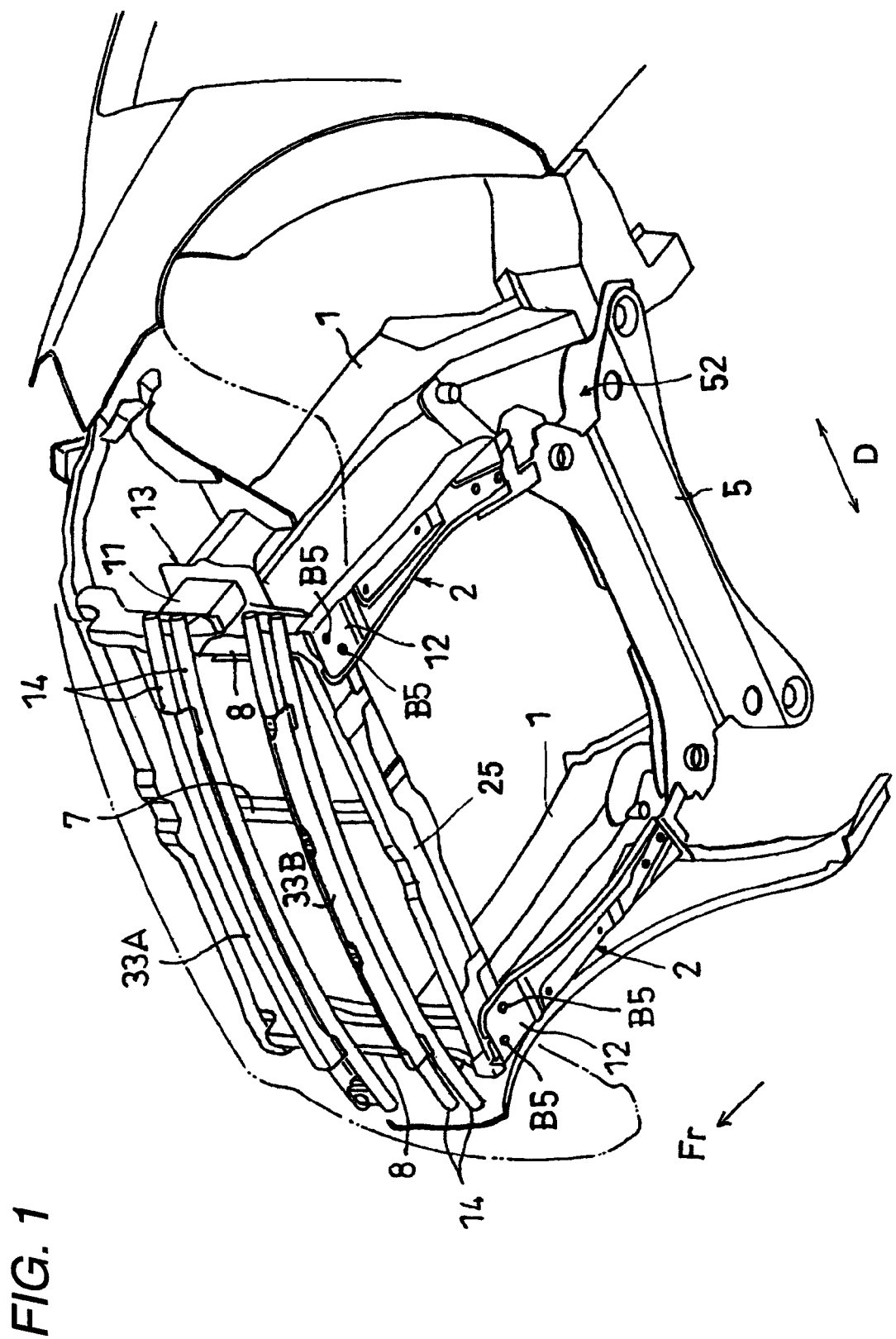
FIG. 1 is a view illustrating a front part structure of a vehicle body when obliquely viewed from the downside.

Hereinafter, an exemplary embodiment of the invention will be described with reference to the accompanying drawings. FIGS. 1 to 4 illustrate a front part structure of a vehicle body of a vehicle. As shown in the respective drawings, a pair of left and right apron lower members 2 are longitudinally disposed below a pair of left and right apron side members 1 which are disposed in a longitudinal direction of a vehicle. At this time, the apron lower members 2 connect a radiator support lower member 25 (which corresponds to a component on the front side of the vehicle) which is disposed in a width direction D of a vehicle to a suspension frame 5 which supports a suspension arm 4 (see FIG. 9) or a steering gear box.

Each of the apron side members 1 includes a first linear portion 1A which extends in the longitudinal direction, a slope portion 1B which extends downward at an oblique angle from an end portion of the first linear portion 1A on the rear side of the vehicle in the backward direction of the vehicle, and a second linear portion 1C which extends from an end portion of the slope portion 1B on the rear side of the vehicle in the backward direction of the vehicle. Each of the apron side members 1 and the apron lower members 2 is formed into a square cylindrical shape by a plate member, and hence prevents a vehicle body from being deformed by receiving a force applied from the front side Fr of the vehicle when a collision occurs from the front side Fr of the vehicle.

A front upper member 9 is disposed above the radiator support lower member 25 in the width direction D of the vehicle, and a center member 7 is suspended between center portions of the radiator support lower member 25 and the front upper member 9 in a vertical direction. In addition, a pair of left and right lamp support braces 8 with a square cylindrical shape are suspended between the radiator support lower member 25 and the front upper member 9 in the vertical direction, and then the lower end portions of the lamp support braces 8 are respectively connected to left and right end portions 25A and 25B (which corresponds to one end portion) of the radiator support lower member 25.

Figure 2:
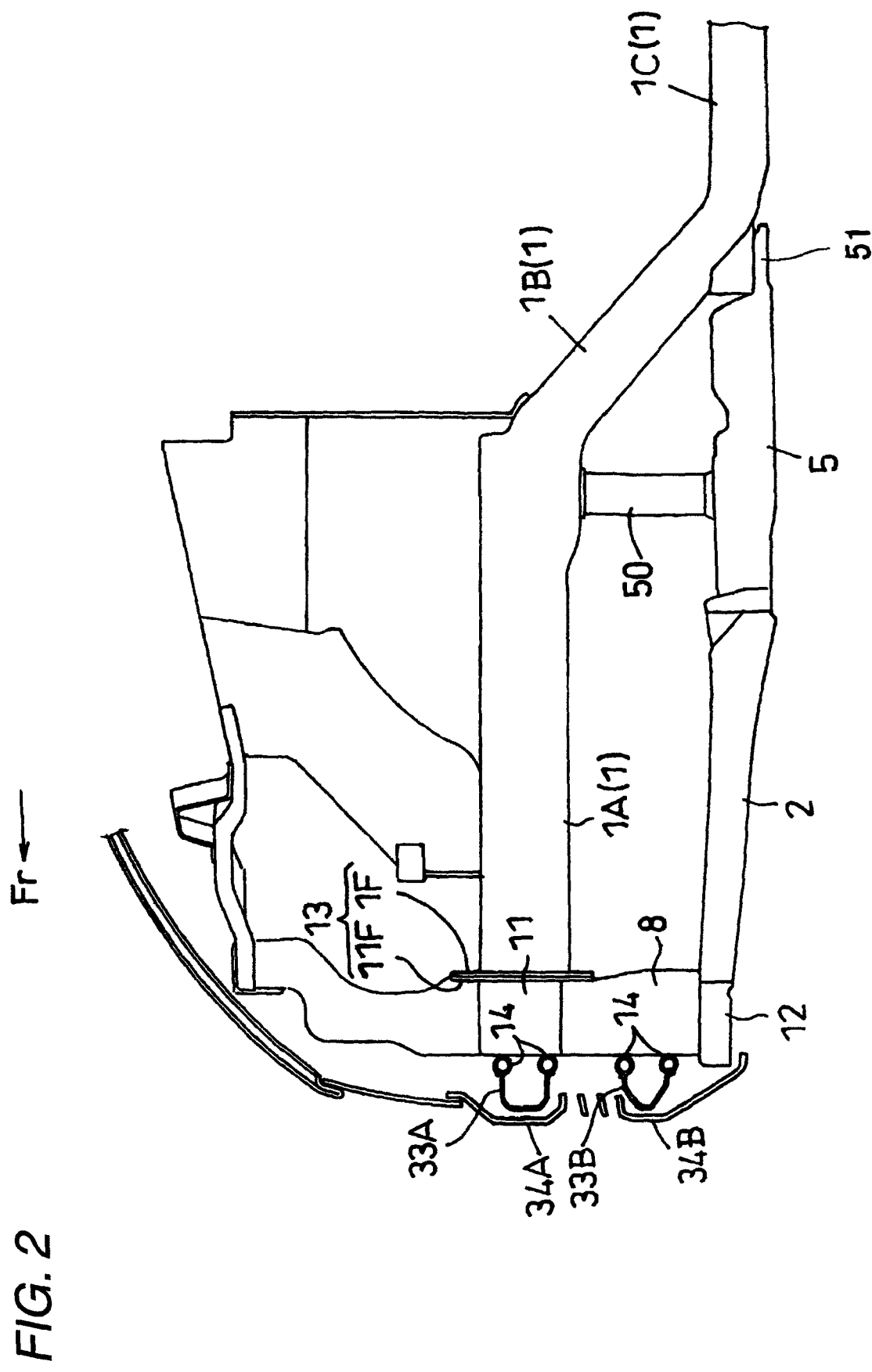
FIG. 2 is a side view illustrating the front part structure of the vehicle body.

As shown in FIGS. 1 and 2, the front end portion of the apron side member 1 is attached to a first shock absorbing portion 11 called a crash box, which is formed into a square box shape in a sectional view by a plate member, through an attachment flange 13. The first shock absorbing portion 11 has a bead which is formed in a side wall thereof so as to have a circular arc shape in a sectional view in the vertical direction and a bead which is formed in both upper and lower surfaces thereof in the width direction D of the vehicle, and is hence configured to be easily deformed by a force applied from the front side Fr of the vehicle.

The front end portion of the first shock absorbing portion 11 is connected to an upper bumper member 33A through a pair of upper and lower long pipe members 14 which are disposed in the width direction D of the vehicle, and a bumper fascia 34A is disposed in the upper bumper member 33A on the front side Fr of the vehicle. The upper bumper member 33A is formed into a U-shape in a sectional view to be opened to the rear side of the vehicle.

Figure 3:
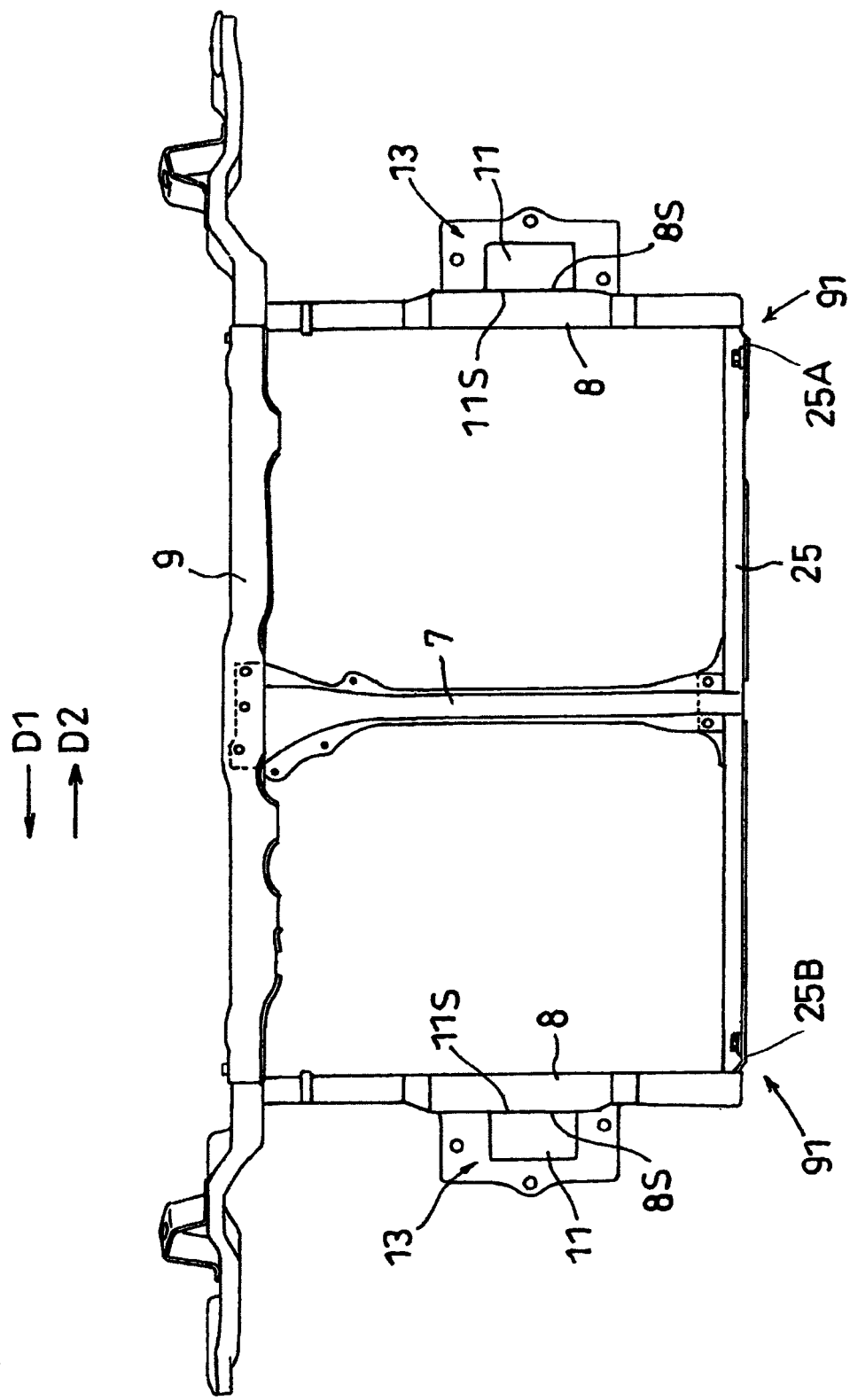
FIG. 3 is a front view illustrating a frame structure of the front part of the vehicle body.
Figure 4:
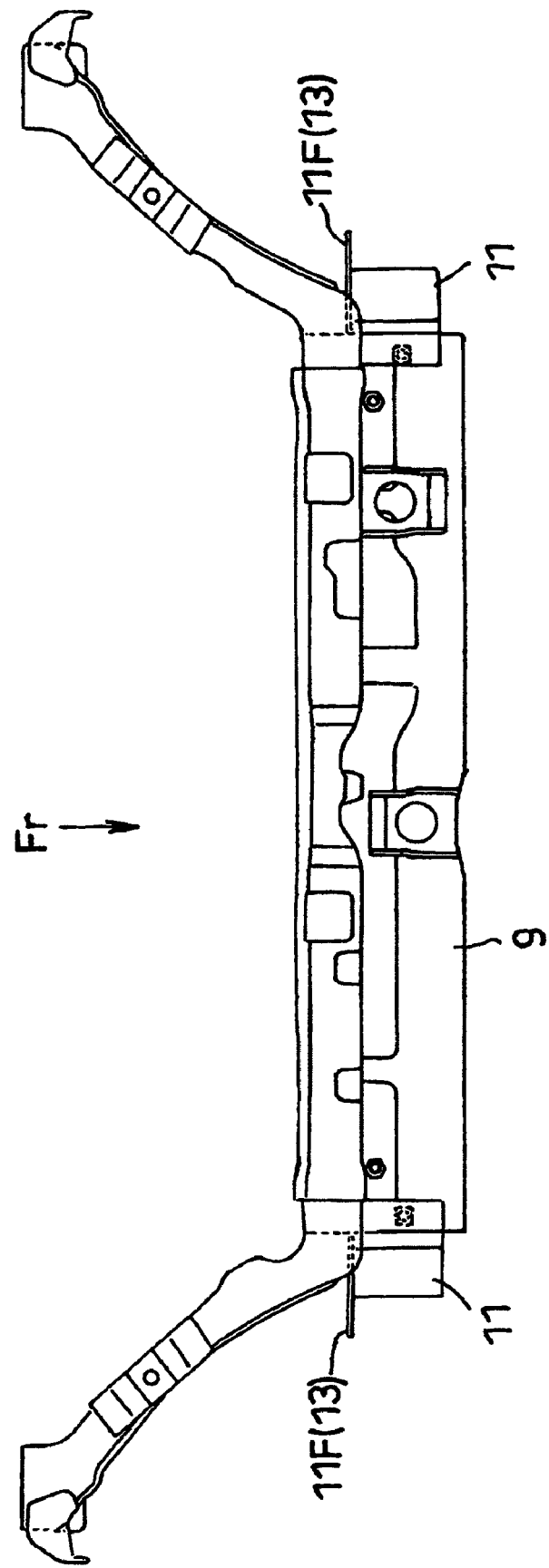
FIG. 4 is a top view illustrating the frame structure of the front part of the vehicle body.

As shown in FIGS. 2 and 3, a side surface 11S (i.e., a flange provided in a side surface) of the first shock absorbing portion 11 on the inside D1 of the width direction of the vehicle and a side surface 8S of the lamp support brace 8 on the outside D2 of the width direction of the vehicle are fixed by welding to each other while overlapping with each other. The attachment flange 13 includes a first flange portion 11F which is fixed by welding to the rear end surface of the first shock absorbing portion 11 and a second flange portion 1F which is fixed to the front end portion of the apron side member 1, and both flange portions 11F and 1F are fixed by a bolt to each other in the longitudinal direction of the vehicle while overlapping with each other.

[Structure of Apron Lower Member 2]

As shown in FIGS. 5(A), 5(B), and 8(A) to 8(C), the apron lower member 2 includes an upper wall 70 and a lower wall 71, and has a long square cylindrical shape in the longitudinal direction of the vehicle. At this time, a height dimension of the apron lower member 2 is set to be smaller than a width dimension thereof. The upper wall 70 is formed into a member separated from the lower wall 71. At this time, a first side wall 72 on the inside D1 of the width direction of the vehicle extends downward from a side portion of the upper wall 70 on the inside D1 of the width direction of the vehicle and a second side wall 73 on the outside D2 of the width direction of the vehicle erects upward from a side portion of the lower wall 71 on the outside D2 of the width direction of the vehicle.

In addition, a first bent piece 74 which is formed such that the lower end portion of the first side wall 72 is bent to the inside D1 of the width direction of the vehicle and one end portion of the lower wall 71 on the inside D1 of the width direction of the vehicle are fixed by welding to each other while the first piece 74 overlaps with the one end portion from the upside. Then, a second bent piece 75 which is formed such that the end portion of the upper wall 70 on the outside D2 of the width direction of the vehicle is bent upward and the upper end portion of the second side wall 73 are fixed by welding to each other while overlapping with each other in the inside D1 of the width direction of the vehicle.

Further, a second shock absorbing portion 12 is provided in the front end portion of the apron lower member 2 so as to be disposed below the first shock absorbing portion 11. That is, as shown in FIG. 2, the front end portion of the apron lower member 2 protrudes more than the attachment flange 13 to the front side Fr of the vehicle, and then the protruding front end portion of the apron lower member 2 is configured to be weaker than an apron lower member portion 36 which is disposed in the front end portion on the rear side of the vehicle, thereby configuring the second shock absorbing portion 12. Strength of the apron lower member portion 36 is stronger than the second shock absorbing portion 12, and strength of the suspension frame 5 is stronger than the apron lower member portion 36. Accordingly, when a shock is applied from the front side of the vehicle, the vehicle is sequentially deformed from the front part of the vehicle, thereby making a deformation of the vehicle as small as possible.

Figure 8:
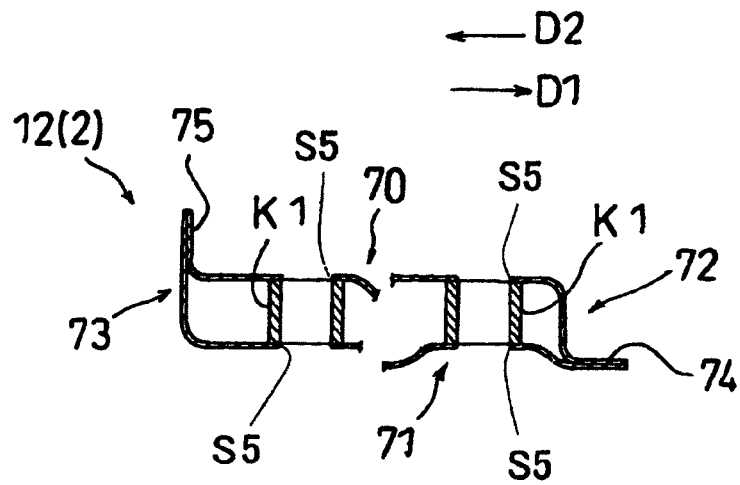
FIG. 8(A) is a sectional view taken along the line A-A shown in FIG. 5(A)
FIG. 8(B) is a sectional view taken along the line B-B shown in FIG. 5(A)
FIG. 8(C) is a sectional view taken along the line C-C shown in FIG. 5(A)
Figure 8:
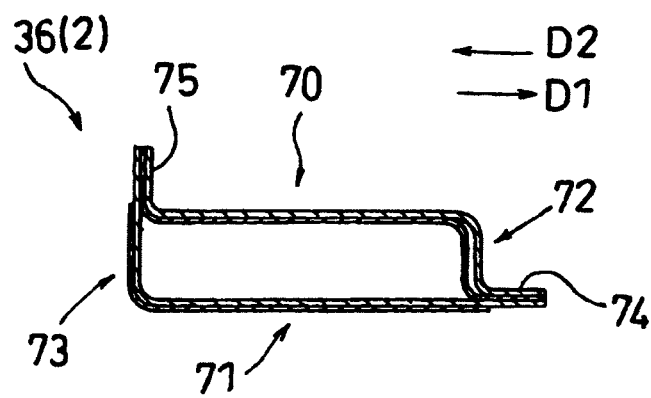
Figure 8:
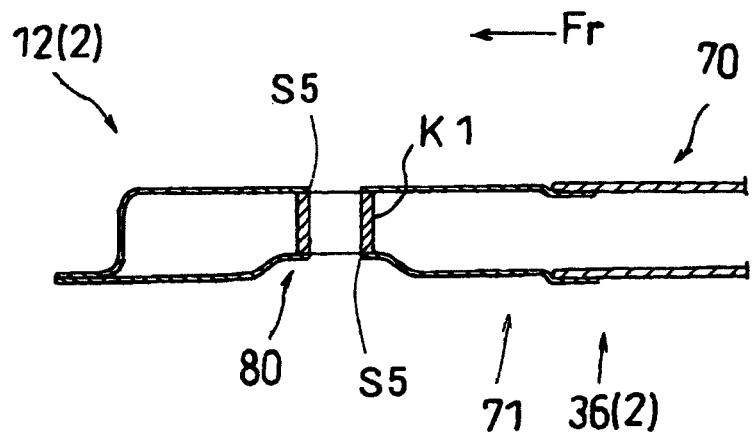

As means for configuring the second shock absorbing portion 12 as the front end portion of the apron lower member 2 to be weaker, this embodiment includes first means (see FIG. 8(C)) in which the second shock absorbing portion 12 is formed by a plate member thinner than that of the apron lower member portion 36, and second means in which a bead 35 formed in the width direction D of the vehicle is formed the upper wall 70 and the lower wall 71 of the second shock absorbing portion 12. Instead of the structure, either the first means or the second means may be adopted. The bead 35 is configured such that a predetermined part of the upper wall 70 and the lower wall 71 is formed into a circular arc shape in a sectional view so as to be convex upward by press machining.

As shown in FIG. 8(C), the end portion of the upper wall 70 of the second shock absorbing portion 12 on the rear side of the vehicle and the end portion of the lower wall 71 of the second shock absorbing portion 12 on the rear side of the vehicle are respectively fixed to the end portion of the upper wall 70 of the apron lower member portion 36 on the front side Fr of the vehicle and the end portion of the lower wall 71 of the apron lower member portion 36 on the front side Fr of the vehicle while overlapping with the end portion of the upper wall 70 and the end portion of the lower wall 71 from the downside.

Figure 5:
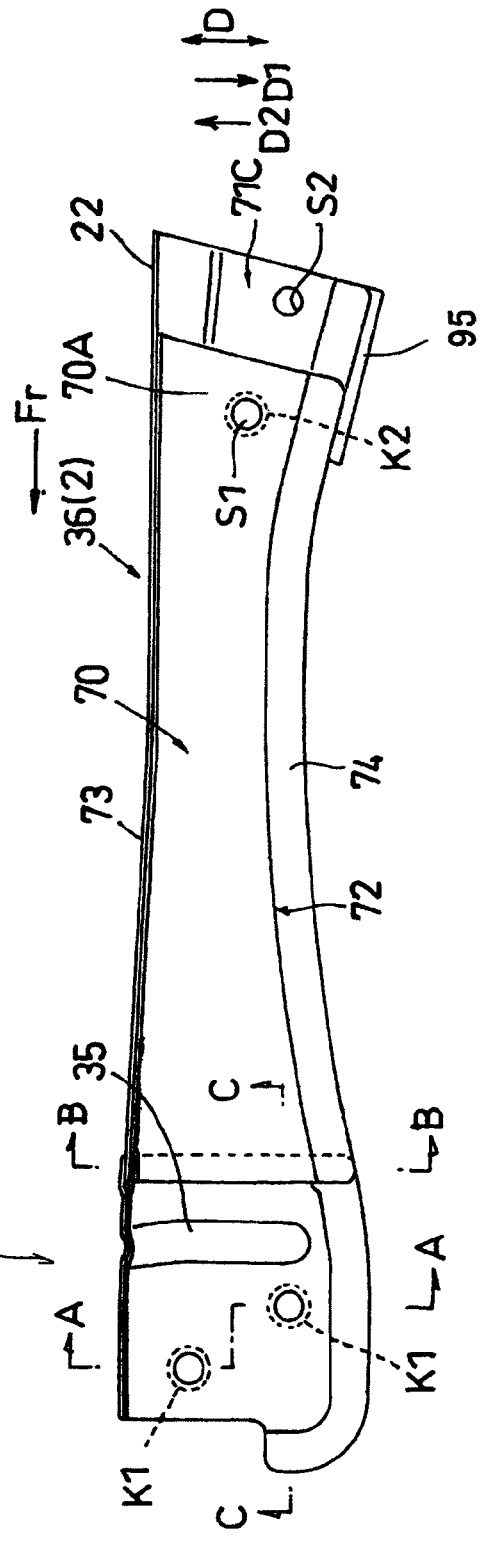
FIG. 5(A) is a top view illustrating an apron lower member.
FIG. 5(B) is a side view illustrating the apron lower member.
Figure 5:
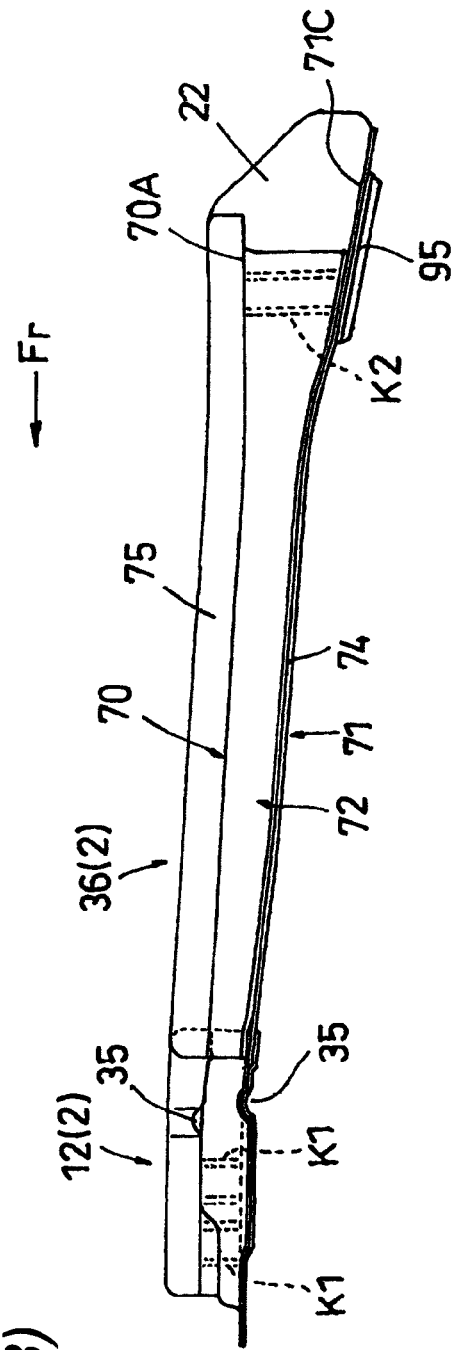

As shown in FIGS. 5(A) and 5(B), the apron lower member portion 36 extends in a linear shape in the longitudinal direction of the vehicle in such a manner that the upper wall 70 is positioned at the same height as that of the upper wall 70 of the second shock absorbing portion 12 and the second side wall 73 on the outside D2 of the width direction D of the vehicle is positioned at the same height as that of the second side wall 73 of the second shock absorbing portion 12 on the outside D2 of the width direction D of the vehicle.

The first side wall 72 of the apron lower member portion 36 on the inside D1 of the width direction is curved in a convex circular arc shape in the outside D2 of the width direction of the vehicle. The lower wall 71 of the apron lower member portion 36 is inclined downward in the backward direction of the vehicle. At this time, in a rear end portion 71C of the lower wall 71 as the rear end portion of the inclined surface, the inclined surface of the rear end portion 71C is inclined downward more than the inclined surface on the front side Fr of the vehicle.

The lower wall 71 of the apron lower member portion 36 extends to the rear side of the vehicle with respect to the upper wall 70 thereof, and a strengthening plate member 95 is fixed by welding to the lower surface of the rear end portion 71C of the lower wall 71 while overlapping with the lower surface of the rear end portion 71C. The rear end portion 71 and the structure in the vicinity thereof will be described in detail later.

Both the upper and lower end portions of first collars K1 are respectively fixed by welding to the lower surface of the upper wall 70 and the upper surface of the lower wall 71 in the state that a pair of first bolt insertion collars K1 are interposed between the upper wall 70 and the lower wall 71 of the second shock absorbing portion 12. Then, shock-absorbing-portion-side bolt insertion holes S5 are formed in the upper wall 70 and the lower wall 71 so as to be concentric with the first collars K1 (see FIGS. 8(A) and 8(C)). The pair of first collars K1 are positioned at different positions in the width direction D of the vehicle and the longitudinal direction of the vehicle (in the longitudinal direction of the apron lower member 2), and a lower wall portion 80 to which the lower end portion of the first collar K1 is fixed by welding is concave upward.

Then, the first shock absorbing portion 11 is connected to the second shock absorbing portion 12 through the lamp support brace 8. That is, the second shock absorbing portion 12 is fixed by a bolt to the connection portion 91 (see FIG. 3) of the lower end portions of the lamp support braces 8 and the left and right end portions 25A and 25B of the radiator support lower member 25 by use of an attachment bolt B5 (see FIG. 1) which is inserted through the shock-absorbing-portion-side bolt insertion hole and the pair of first collars K1 from the downside.

A lower bumper member 33B is connected to the front surface of the lamp support brace between the first shock absorbing portion 11 and the second shock absorbing portion 12 through the pair of upper and lower long pipe members 14 which are disposed in the width direction D of the vehicle, and a bumper fascia 34B is disposed in the lower bumper member 33B on the front side Fr of the vehicle. The lower bumper member 33B is formed into U-shape in a sectional view to be opened to the rear side of the vehicle.

[Structure of Suspension Frame 5]

Figure 6:
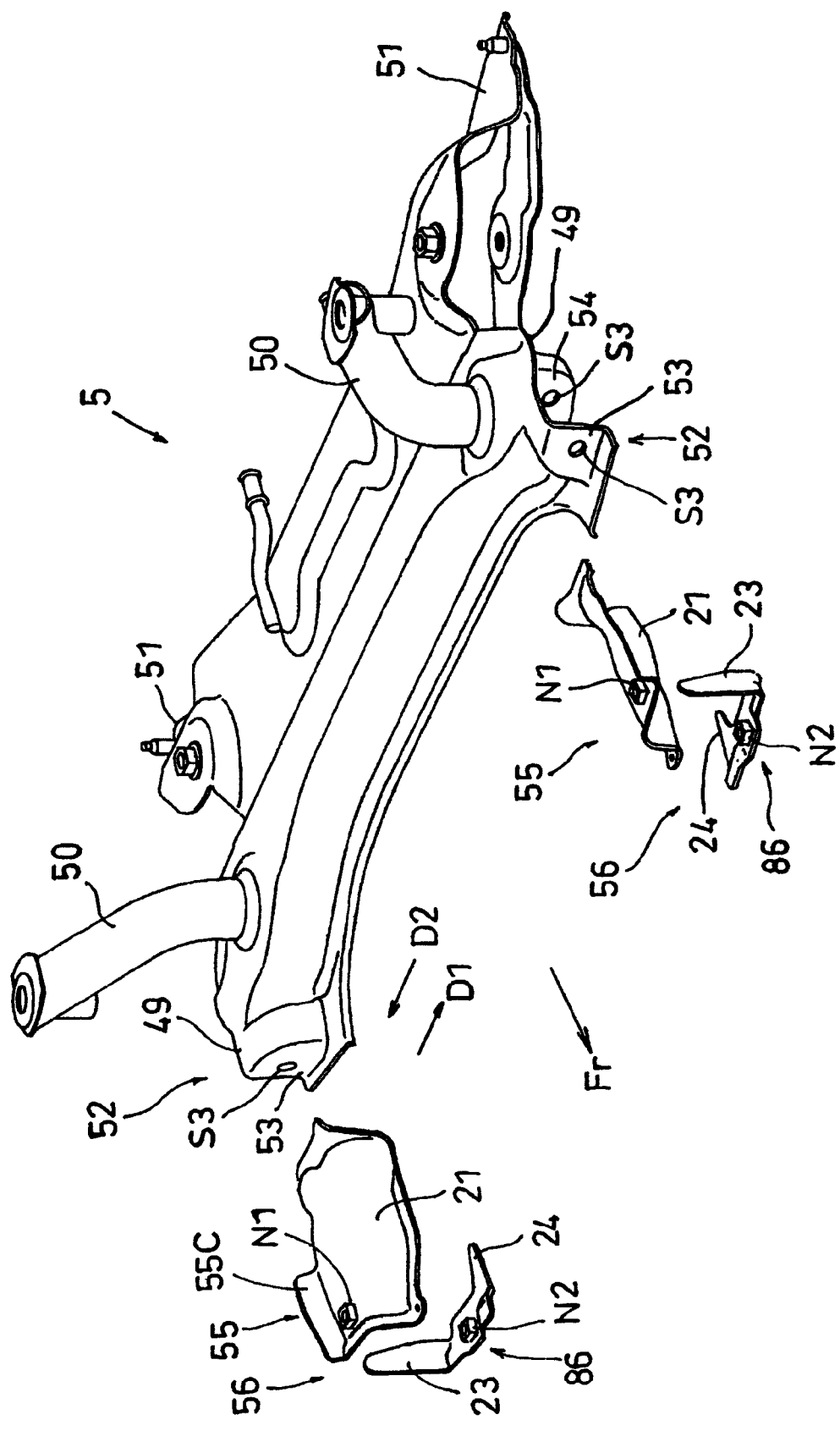
FIG. 6 is an exploded perspective view illustrating a suspension frame.
Figure 7:
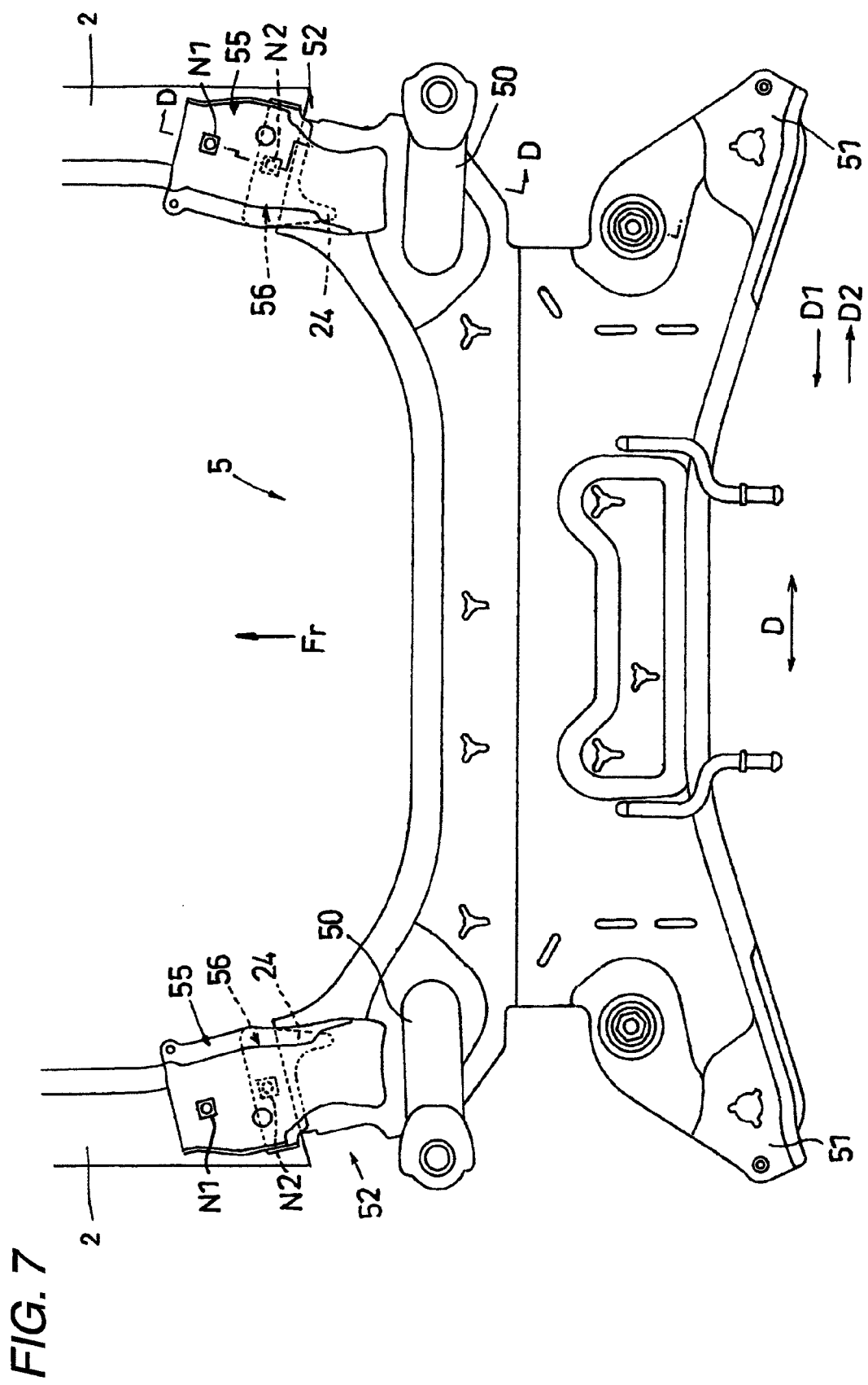
FIG. 7 is a top view illustrating the suspension frame.

As shown in FIGS. 6 and 7, the suspension frame 5 is formed into a hollow shape so that a height dimension is smaller than a width dimension, that is, the width dimension is longer than the height dimension. In addition, a pair of connection pipes 50, which are bent from the end portion of the suspension frame 5 on the front side Fr of the vehicle, are erected. As shown in FIGS. 1 and 2, the upper end portions of the connection pipes 50 is connected to the lower surfaces of the rear end portion of the first linear portions 1A of the apron side members 1 and then connection portions 51, which are provided in both left and right end portions of the suspension frame 5 on the rear side of the vehicle, are connected to the lower end portions of the slope portions 1B of the apron side members 1. The apron lower members 2, the suspension frame 5, and the second linear portions 1C of the apron side members 1 are horizontally connected to each other.

Suspension arm attachment portions 52 are disposed in the front end portion of the suspension frame 5 on the front side Fr of the vehicle rather than the lower parts of the connection pipes 50, and the suspension arm attachment portions 52 are respectively provided with a front wall 53 and a rear wall 54 which are opposed to each other in the longitudinal direction of the vehicle. Then, an upper surface portion 49 is suspended between the front wall 53 and the rear wall 54, and a suspension-arm-attachment-bolt insertion hole S3 (which corresponds to a third bolt insertion hole), through which a suspension arm attachment bolt B3 is inserted, is formed in the front wall 53 and the rear wall 54. Reference Numeral N3 shown in FIG. 9 denotes a third nut to which the suspension arm attachment bolt B3 is screw-connected, and the third nut is fixed by welding to the rear surface of the rear wall 54.

A gap formed between the front wall 53 and the rear wall 54 is opened to the downside in the outside D2 of the width direction of the vehicle. Then, as shown in FIG. 9, one end portion 4A of the suspension arm 4 is attached to the front wall 53 and the rear wall 54 by the suspension arm attachment bolt B3 which is inserted through the suspension-arm-attachment-bolt insertion hole S3.

[Structure of Connection Portion of Suspension Frame 5 and Apron Lower Member 2]

Figure 9:
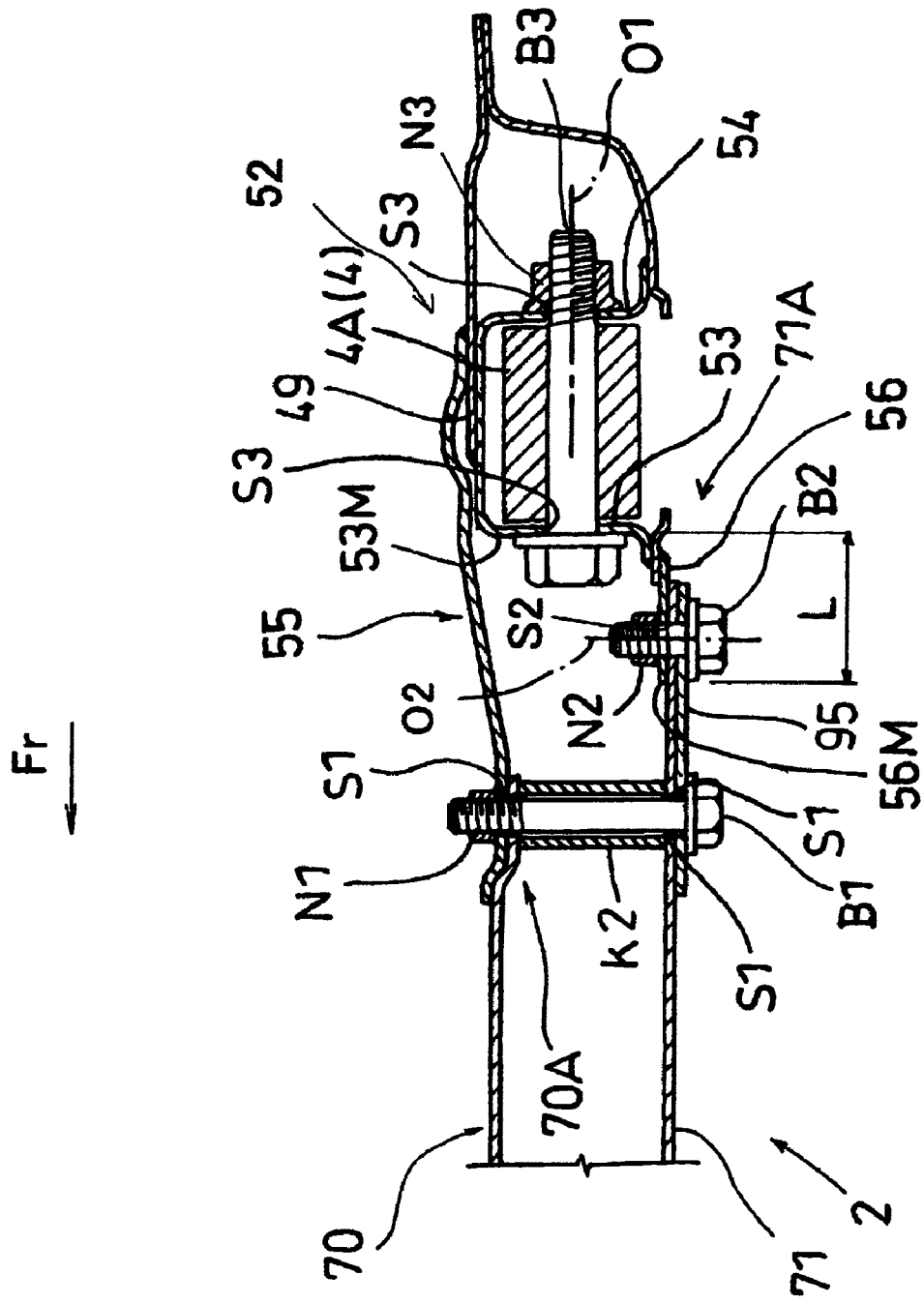
FIG. 9 is a sectional view illustrating a state in which a relative component is mounted when taken along the line D-D shown in FIG. 7.

As shown in FIGS. 7 and 9, the upper wall 70 and the lower wall 71 of the apron lower member 2 which are opposed to each other (which correspond to two wall portions) are respectively fixed to an upper attachment portion 55 and a lower attachment portion 56 which are provided in the end portion of the suspension frame 5 on the front side Fr of the vehicle.

The rear part of the upper attachment portion 55 on the rear side of the vehicle is fixed by welding to the upper surface portion 49 of the suspension arm attachment portion 52, and the front part thereof on the front side Fr extends from the upper surface portion 49 to the front side Fr of the vehicle. Then, a first nut N1 is fixed by welding to the upper surface of the upper attachment portion 55.

Figure 10:
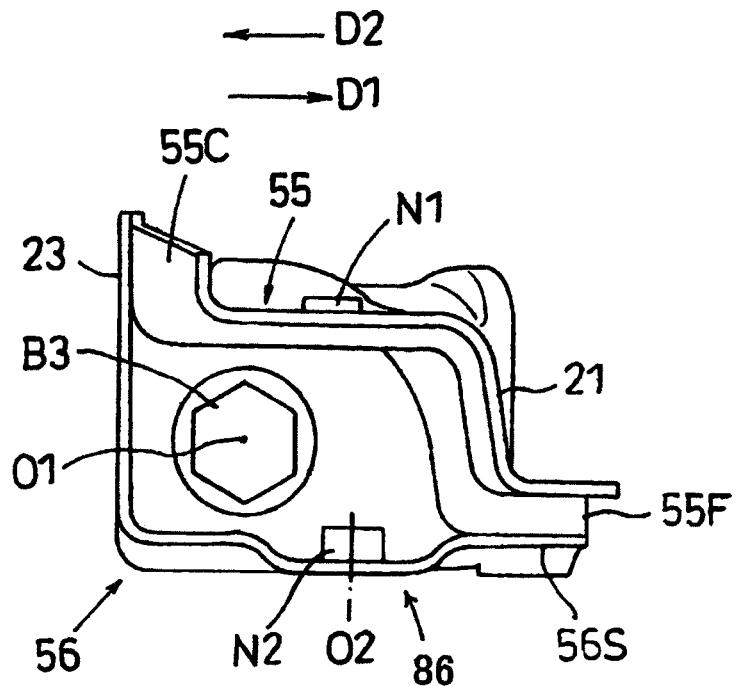
FIG. 10 is a front view illustrating a state in which an upper attachment portion and a lower attachment portion are mounted.
Figure 11:
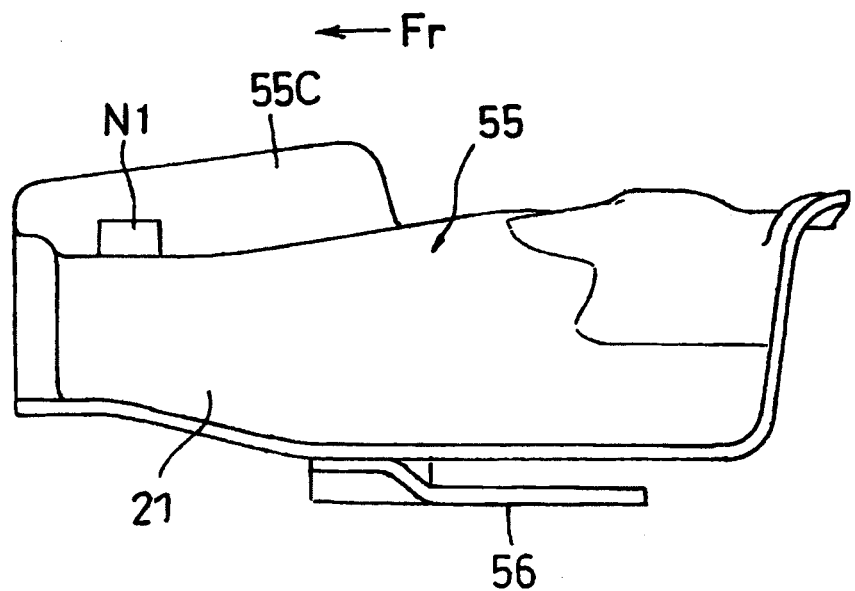
FIG. 11 is a side view illustrating the state in which the upper attachment portion and the lower attachment portion are mounted.

The lower attachment portion 56 is provided with a welding attachment piece 24 which extends from the side portion thereof on the inside D1 of the width direction of the vehicle to the rear side of the vehicle. At this time, the attachment piece 24 and the rear end portion of the lower attachment portion 56 on the outside D2 of the width direction of the vehicle are fixed by welding to the lower surface of the suspension arm attachment portion 52. A second nut N2 is fixed by welding to the upper surface of the lower attachment portion 56. As shown in FIG. 10, a side portion 56S of the lower attachment portion 56 on the inside D1 of the width direction of the vehicle overlaps with a bent piece 55F from the downside, the bent piece 55F being formed in a side portion of the upper attachment portion 55 on the inside D1 of the width direction of the vehicle.

As shown in FIG. 9, a first bolt insertion hole S1 which is concentric with the first nut N1 is formed in the lower wall 71 of the apron lower member 2, the strengthening plate member 95, a first attachment portion 70A of the upper wall 70, and the upper attachment portion 55. Then, in the state that a second collar K2 which is concentric with the first nut N1 is interposed between the upper wall 70 and the lower wall 71, upper and lower end portions of the second collar K2 are fixed by welding to the lower surface of the upper wall 70 and the upper surface of the lower wall 71. Then, the first attachment portion 70A of the upper wall 70 overlaps with the upper attachment portion 55 from the downside, and the first attachment bolt B1 is inserted through the first bolt insertion hole S1 and the second collar K2 from the downside of the lower wall 71 and the strengthening plate member 95. At the same time, the attachment bolt B1 is screw-connected to the first nut N1, and thus the first attachment portion 70A of the upper wall 70 is fixed to the upper attachment portion 55 by a bolt from the downside.

Meanwhile, a second bolt insertion hole S2 which is concentric with the second nut N2 is formed in a second attachment portion 71A of the lower wall 71, the strengthening plate member 95, and the lower attachment portion 56. Then, the second attachment portion 71A of the lower wall 71 overlaps with the lower attachment portion 56 from the downside, the second attachment bolt B2 is inserted through the second bolt insertion hole S2 from the downside of the lower wall 71. At the same time, the second attachment bolt B2 is screw-connected to the second nut N2, and thus the second attachment portion 71A is fixed to the lower attachment portion 56 by a bolt.

As shown in FIG. 9, the upper attachment portion 55 extends to the front side Fr with respect to the lower attachment portion 56, and the first nut N1 of the upper attachment portion 55 is disposed at a position closer to the front side Fr than the second nut N2 of the lower attachment portion 56. A distance L from an outer surface 53M of the front wall 53 of the suspension arm attachment portion 52 to an end edge 56M of the lower attachment portion 56 on the front side Fr of the vehicle is 50 mm (the distance is not limited to this value). Accordingly, when an operator carries out a screw-connecting operation of the third nut N3 by inserting the suspension arm attachment bolt B3 through the suspension-arm-attachment bolt insertion hole S3, it is possible for the operator to insert a hand to a position around the suspension-arm-attachment-bolt insertion hole S3 and it is possible to grip the suspension arm attachment bolt B3 with a hand until the suspension arm attachment bolt B3 engages with the third nut N3, thereby facilitating the screw-connecting operation. As a result, it is not necessary to shorten the length of the suspension arm attachment bolt B3.

Additionally, the second attachment portion 71A of the lower wall 71 extends to the rear side of the vehicle with respect to the first attachment portion 70A of the upper wall 70, and a first vertical wall 21 extends downward from the side portion of the upper attachment portion 55 on the inside D1 of the width direction of the vehicle. Also, a second vertical wall 22 erects from the side portion of the rear end portion 71C of the lower wall 71 on the outside D2 of the width direction of the vehicle to thereby be opposed to the first vertical wall 21.

Then, a third vertical wall 23 erects from the side portion of the lower attachment portion 56 on the outside D2 of the width direction of the vehicle, and thus the upper end portion of the third vertical wall 23 overlaps with a bent piece 55C, which erects from the side portion of the upper attachment portion 55 on the outside D2 of the width direction of the vehicle, from the outside D2 of the width direction of the vehicle.

As shown in FIGS. 9 and 10, when viewed in the longitudinal direction of the vehicle, an axial center O1 of the suspension-arm-attachment-bolt insertion hole S3 and an axial center O2 of the second nut N2 are deviated from each other in the width direction D of the vehicle. Also, a lower attachment portion 86 to which the second nut N2 is fixed is concave downward, and thus the second nut N2 is prevented from interfering with a head part of the suspension arm attachment bolt B3 which is inserted through the suspension-arm-attachment-bolt insertion hole S3.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A front part structure of a vehicle body, comprising:
   a front-side component of a vehicle;
   a suspension frame disposed posterior to the front-side component in a longitudinal direction of the vehicle;
   an apron side member extending in the longitudinal direction;
   an apron lower member extending in the longitudinal direction, connecting the front-side component and the suspension frame and being disposed below the apron side member;
   a first shock absorbing portion which is provided in a front end portion of the apron side member; and
   a second shock absorbing portion which is disposed below the first shock absorbing portion,
   wherein the first shock absorbing portion is attached to the front end portion of the apron side member through an attachment flange;
   wherein the attachment flange includes a first flange portion welded and fixed to a rear end surface of the first shock absorbing portion and a second flange portion welded and fixed to the front end portion of the apron side member;
   wherein the first flange portion is fastened to the second flange portion in the longitudinal direction;
   wherein the apron lower member includes the front end portion disposed anterior to the attachment flange in the longitudinal direction and rear portion disposed posterior to the front end portion;
   wherein a rigidity of a front end portion of the apron lower member is lower than a rigidity of a rear portion of the apron lower member so that the front end portion serves as the second shock absorbing portion;
   wherein the first shock absorbing portion is connected to the second shock absorbing portion through a lamp support brace extending in a vertical direction;
   wherein a side face of the first shock absorbing portion is welded and fixed to an outer side face of the lamp support brace in a width direction of the vehicle;
   wherein the second shock absorbing portion is fixed to a lower end portion of the lamp support brace by an attachment bolt which is inserted through a bolt insertion hole formed in the second shock absorbing portion from below.

2. The front port structure as set forth in claim 1, wherein the front end portion of the apron lower member is comprised of a first plate member and the rear portion is comprised of a second plate member; and
   wherein a thickness of the first plate member is thinner than the second plate member such that the rigidity of the front end portion of the apron lower member is lower than the rigidity of the rear portion of the apron lower member.

3. The front part structure as set forth in claim 1, wherein the first shock absorbing portion is comprised of a plate member so as to have a square box shape in a sectional view.

4. The front part structure as set forth in claim 1, wherein the front-side component includes a radiator support lower member extending in a width direction of the vehicle;
   wherein the lower end portion of the lamp support brace is connected to one end portion of the radiator support lower member; and
   wherein the second shock absorbing portion is fixed to a connection portion between the lower end portion of the lamp support brace and the one end portion of the radiator support lower member by the attachment bolt.

5. The front part structure as set forth in claim 1, wherein the front end portion of the apron lower member is comprised of a plate member; and
   wherein a convex portion is formed on the plate member.

6. The front part of structure as set forth in claim 1, wherein a rigidity of the rear portion of the apron lower member is lower that a rigidity of the suspension from such that the vehicle is sequentially deformed from a front part of the vehicle when a shock is applied from a front side of the vehicle.

* * * * *